United States Patent
Yu

(10) Patent No.: US 8,688,114 B2
(45) Date of Patent: Apr. 1, 2014

(54) METHOD OF SELECTING CARDS FOR MULTI-MODE MOBILE PHONE

(75) Inventor: Tian Yu, Nanjing (CN)

(73) Assignee: Samsung Electronics Co., Ltd., Suwon-Si (KR)

( * ) Notice: Subject to any disclaimer, the term of this patent is extended or adjusted under 35 U.S.C. 154(b) by 36 days.

(21) Appl. No.: 13/346,695

(22) Filed: Jan. 9, 2012

(65) Prior Publication Data

US 2012/0178412 A1   Jul. 12, 2012

(30) Foreign Application Priority Data

Jan. 11, 2011   (CN) .......................... 2011 1 0021884

(51) Int. Cl.
*H04W 4/00*   (2009.01)

(52) U.S. Cl.
USPC .................. 455/435.1; 455/435.2; 455/435.3; 455/452.1

(58) Field of Classification Search
USPC ............................. 455/136–444, 452.1, 452.2
See application file for complete search history.

(56) References Cited

U.S. PATENT DOCUMENTS

| | | | | |
|---|---|---|---|---|
| 5,311,325 A | * | 5/1994 | Edwards et al. | 725/8 |
| 6,104,792 A | * | 8/2000 | Lautenschlager et al. | 379/130 |
| 6,157,813 A | * | 12/2000 | Lewiner et al. | 340/7.1 |
| 2002/0176553 A1 | * | 11/2002 | Aschir | 379/114.2 |
| 2007/0184858 A1 | * | 8/2007 | Landschaft et al. | 455/466 |

FOREIGN PATENT DOCUMENTS

| | | |
|---|---|---|
| EP | 1051052 A1 | 11/2000 |
| WO | WO 98/58512 | 12/1998 |
| WO | WO 2008/081040 A1 | 7/2008 |

OTHER PUBLICATIONS

Extended European Search Report dated Mar. 28, 2012 in connection with European Patent Application No. 12150584.6, 5 pages.

* cited by examiner

*Primary Examiner* — Kashif Siddiqui
*Assistant Examiner* — Marisol Fahnert

(57) ABSTRACT

A method of selecting cards for multi-mode mobile phone. The multi-mode mobile phone includes at least one phone card that supports a communication network mode and corresponds to a phone card ID. Charging information is obtained from interfaces provided by operators, the charging information including charge for each communication service of the communication network mode supported by the phone card. A charging information table is generated according to the charging information, the charging information table including an association between the phone card ID and the charge for each communication service. When a communication service is started, the charging information table is queried and the most economical communication service charge from the charging information table is selected for the started communication service A corresponding phone card ID is also selected. The multi-mode mobile phone is switched to the phone card corresponding to the selected phone card ID to communicate.

20 Claims, 3 Drawing Sheets

METHOD OF SELECTING CARDS FOR MULTI-MODE MOBILE PHONE

CROSS-REFERENCE TO RELATED APPLICATION(S) AND CLAIM OF PRIORITY

The present application is related to and claims the benefit under 35 U.S.C. §119(a) of a Chinese Patent Application filed in the State Intellectual Property Office of the People's Republic of China on Jan. 11, 2011 and assigned Serial No. 201110021884.5, the entire disclosure of which is hereby incorporated by reference.

TECHNICAL FIELD OF THE INVENTION

The present disclosure relates to mobile phone technology, and more particularly to a method of selecting cards for multi-mode mobile phone.

BACKGROUND OF THE INVENTION

A multi-mode mobile phone usually includes a plurality of phone cards, and each phone card supports one communication network mode. Therefore, the multi-mode mobile phone can work in different communication network modes. The communication network mode described herein can be Global System for Mobile communications (GSM), Code Division Multiple Access (CDMA), Persona Handyphone System (PHS), or the like. In this way, the multi-mode mobile phone can switch between different communication network modes according to a user's personal wishes.

Although the current multi-mode mobile phones can switch between different communication network modes and use different phone cards to communicate, in order to meet the user's desire for cost savings and the like, the switching is realized manually. For example, some dual-mode mobile phones include two cards, of which the first card supports GSM and the second card supports CDMA. When the user wants to use a service (such as short message service), the mobile phone can ask the user whether to switch, and can provide options for the user. At this time, the user selects from the options according to the charging information of each phone card, and then the mobile phone will switch or not switch according to the user selection.

In summary, when multi-mode mobile phones in the existing technologies are used to meet the individual interests of users, the mobile phones are usually operated manually. Therefore, the operation thereof is inconvenient and inflexible.

SUMMARY OF THE INVENTION

To address the above-discussed deficiencies of the prior art, it is a primary object to provide a method of selecting cards for multi-mode mobile phone, which can overcome the inconvenience of manual operation and implement smart card selection so as to meet the user's need for cost savings.

For the purpose of the disclosure, the embodiments of the disclosure include a method of selecting cards for a multi-mode mobile phone that includes at least one phone card supporting a communication network mode and corresponding to a phone card ID. The method includes obtaining charging information from interfaces provided by operators through the multi-mode mobile phone, the charging information including charge for each communication service of the communication network mode supported by the at least one phone card. The method also includes generating a charging information table according to the charging information, the charging information table including an association between the phone card ID and the charge for each communication service. The method further includes querying the charging information table through the multi-mode mobile phone after starting one communication service and selecting a most economical communication service charge from the charging information table for the started communication service and corresponding phone card ID. The method still further includes switching the multi-mode mobile phone to the phone card corresponding to the selected phone card ID to communicate.

In the above technical solution, the charge for each communication service includes regular service information of each communication service. The charging information table includes an association between the phone card ID and each regular service information. The regular service information includes charge of a single service, charge of service per unit time, flow per unit time or charge of flow per unit.

In the above technical solution, the querying of the charging information table through the multi-mode mobile phone after starting one communication service and selecting the most economical communication service charge from the charging information table for the started communication service and corresponding phone card ID includes querying the regular service information in the charging information table according to the started communication service and selecting the lowest charge of a single service, the lowest charge of service per unit time, the most flow per unit time or the lowest charge of flow per unit, and selecting the corresponding phone card ID.

In the above technical solution, the querying of the regular service information in the charging information table according to the started communication service and selecting the lowest charge of a single service, the lowest charge of service per unit time, the most flow per unit time or the lowest charge of flow per unit, and selecting the corresponding phone card ID includes one of the following:

(i) When the started communication service is a short message service, querying the regular service information of the short message service in the charging information table and selecting the lowest charge of a single service and the corresponding phone card ID;

(ii) When the started communication service is a multimedia messaging service, querying the regular service information of the multimedia messaging service in the charging information table and selecting the lowest charge of a single service and the corresponding phone card ID;

(iii) When the started communication service is a local call service, querying the regular service information of the local call service in the charging information table and selecting the lowest charge of service per unit time and the corresponding phone card ID;

(iv) when the started communication service is a long-distance call service, querying the regular service information of the long-distance call service in the charging information table and selecting the lowest charge of service per unit time and the corresponding phone card ID;

(v) When the started communication service is a network service, querying the regular service information of the network service in the charging information table and selecting the lowest charge of service per unit time, the most flow per unit time or the lowest charge of flow per unit, and selecting the corresponding phone card ID.

In the above technical solution, the charge for each communication service includes free service information of each communication service. The charging information table includes correspondence between the phone card ID and each free service information. The free service information includes number of free services, free service duration or free service flow.

In the above technical solution, the querying of the charging information table through the multi-mode mobile phone after starting one communication service and selecting the most economical communication service charge from the charging information table for the started communication service and corresponding phone card ID includes querying the free service information in the charging information table according to the started communication service. If there exists usable free service information, selecting the maximum number of free services, the longest free service duration or the maximum free service flow, and selecting the corresponding phone card ID.

In the above technical solution, the free service information in the charging information table is queried according to the started communication service. If there exists usable free service information, selecting the maximum number of free services, the longest free service duration or the maximum free service flow, and selecting the corresponding phone card ID includes one of the following:

(i) When the started communication service is a short message service, querying numbers of free services of short message services in the charging information table, if there exists usable free service, selecting the maximum number of free services and the corresponding phone card ID;

(ii) When the started communication service is a multimedia messaging service, querying numbers of free services of the multimedia messaging service in the charging information table, if there exists usable free service, selecting the maximum number of free services and the corresponding phone card ID;

(iii) When the started communication service is a local call service, querying free service duration of the local call service in the charging information table, if there exists usable free service, selecting the longest free service duration and the corresponding phone card ID;

(iv) When the started communication service is a long-distance call service, querying the free service duration of the long-distance call service in the charging information table, if there exists usable free service, selecting the longest free service duration and the corresponding phone card ID;

(v) When the started communication service is a network service, querying the free service duration or free service flow of the network service in the charging information table, if there exists usable free service, selecting the longest free service duration or maximal free service flow and the corresponding phone card ID.

In the above technical solution, the charge for each communication service includes discount service information of each communication service. The charging information table includes correspondence between the phone card ID and each discount service information. The discount service information includes preferential period and preferential charge.

In the above technical solution, when the multi-mode mobile phone queries the charging information table, the selecting of the most economical communication service charge from the charging information table for the started communication service and corresponding phone card ID includes querying the discount service information in the charging information table according to the started communication service. If a current time is in a preferential period, selecting the lowest preferential charge and selecting the corresponding phone card ID.

In the above technical solution, the discount service information in the charging information table is queried according to the started communication service. If a current time is in a preferential period, selecting the lowest preferential charge and selecting the corresponding phone card ID includes one of the following:

(i) When the started communication service is a short message service, querying preferential periods of the short message service; if current time is in the preferential periods, selecting the lowest preferential charge and selecting the corresponding phone card ID;

(ii) When the started communication service is a multimedia messaging service, querying preferential periods of the multimedia messaging service in the charging information table, if current time is in the preferential periods, selecting the lowest preferential charge and the corresponding phone card ID;

(iii) When the started communication service is a local call service, querying preferential periods of the local call service in the charging information table, if current time is in the preferential periods, selecting the lowest preferential charge and the corresponding phone card ID;

(iv) When the started communication service is a long-distance call service, querying the preferential periods of the long-distance call service in the charging information table, if current time is in the preferential periods, selecting the lowest preferential charge and the corresponding phone card ID;

(v) When the started communication service is a network service, querying the preferential periods of the network service, if current time is in one of the preferential periods, selecting the lowest preferential charge and the corresponding phone card ID.

In the above technical solution, the charge for each communication service includes regular service information, free service information and discount service information of each communication service. The charging information table includes correspondence between the phone card ID and each regular service information, correspondence between the phone card ID and each free service information, and correspondence between the phone card ID and each discount service information. The regular service information includes charge of a single service, charge of service per unit time, flow per unit time or charge of flow per unit. The free service information includes number of free services, free service duration or free service flow. The discount service information includes preferential period and preferential charge.

In the above technical solution, the querying of the charging information table through the multi-mode mobile phone after starting one communication service and selecting the most economical communication service charge from the charging information table for the started communication service and corresponding phone card ID includes one of the following:

(i) Querying the free service information in the charging information table according to the started communication service, and if there exists usable free service information, selecting the maximum number of free services, the longest free service duration or the maximum free service flow, and selecting the corresponding phone card ID;

(ii) Querying the discount service information in the charging information table according to the started communication service, and if a current time is in a preferential period, selecting the lowest preferential charge and the corresponding phone card ID;

(iii) Querying the regular service information in the charging information table according to the started communication service, and selecting the lowest charge of a single service, the lowest charge of service per unit time, the most flow per unit time or the lowest charge of flow per unit, and selecting the corresponding phone card ID.

In the above technical solution, this method further comprises updating the charging information table.

In summary, the present disclosure provides a method of selecting cards for multi-mode mobile phone, a charging information table is generated based on the charging information obtained from the operators in advance. When a service is started, the multi-mode mobile phone can query the charging information table to determine which phone card should be used. This can better meet the goal of user cost savings and implement the smart card selection.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
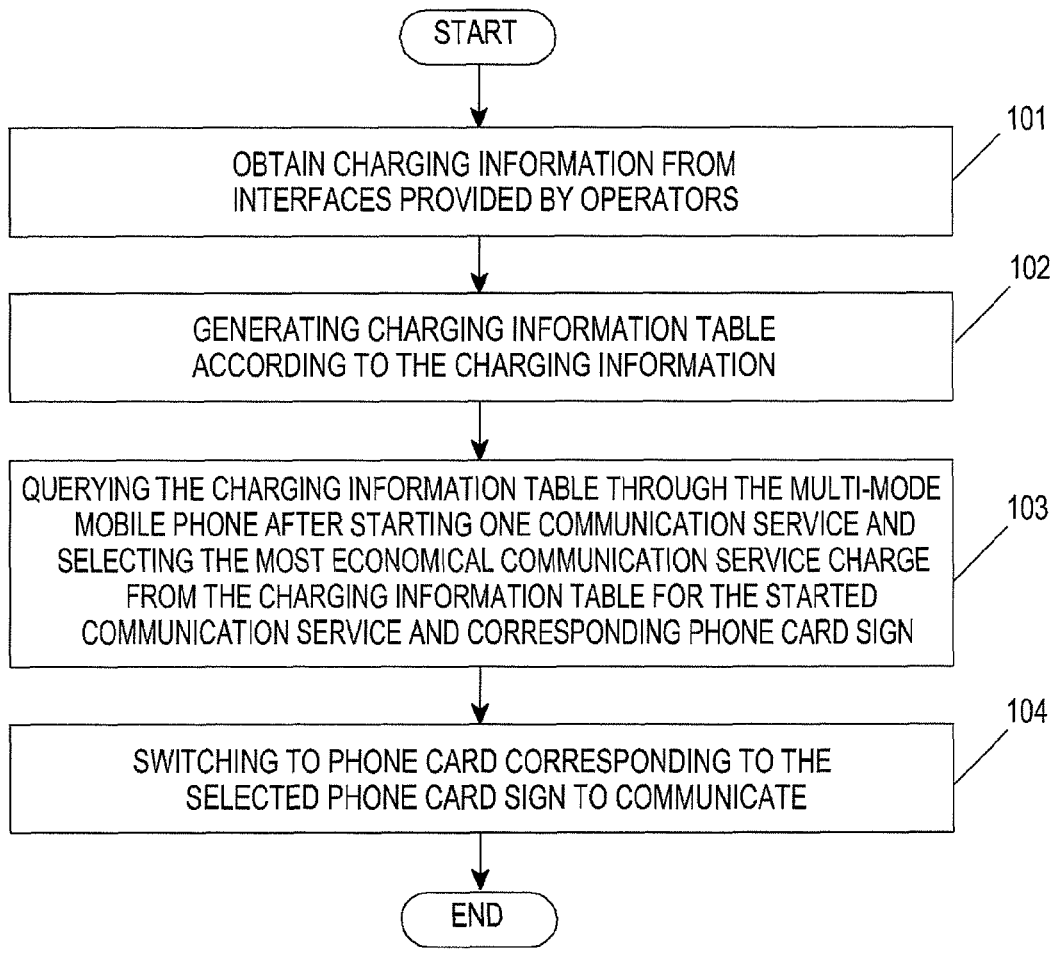
FIG. 1 depict a method flowchart according to a first embodiment of the present disclosure.
Figure 2A:
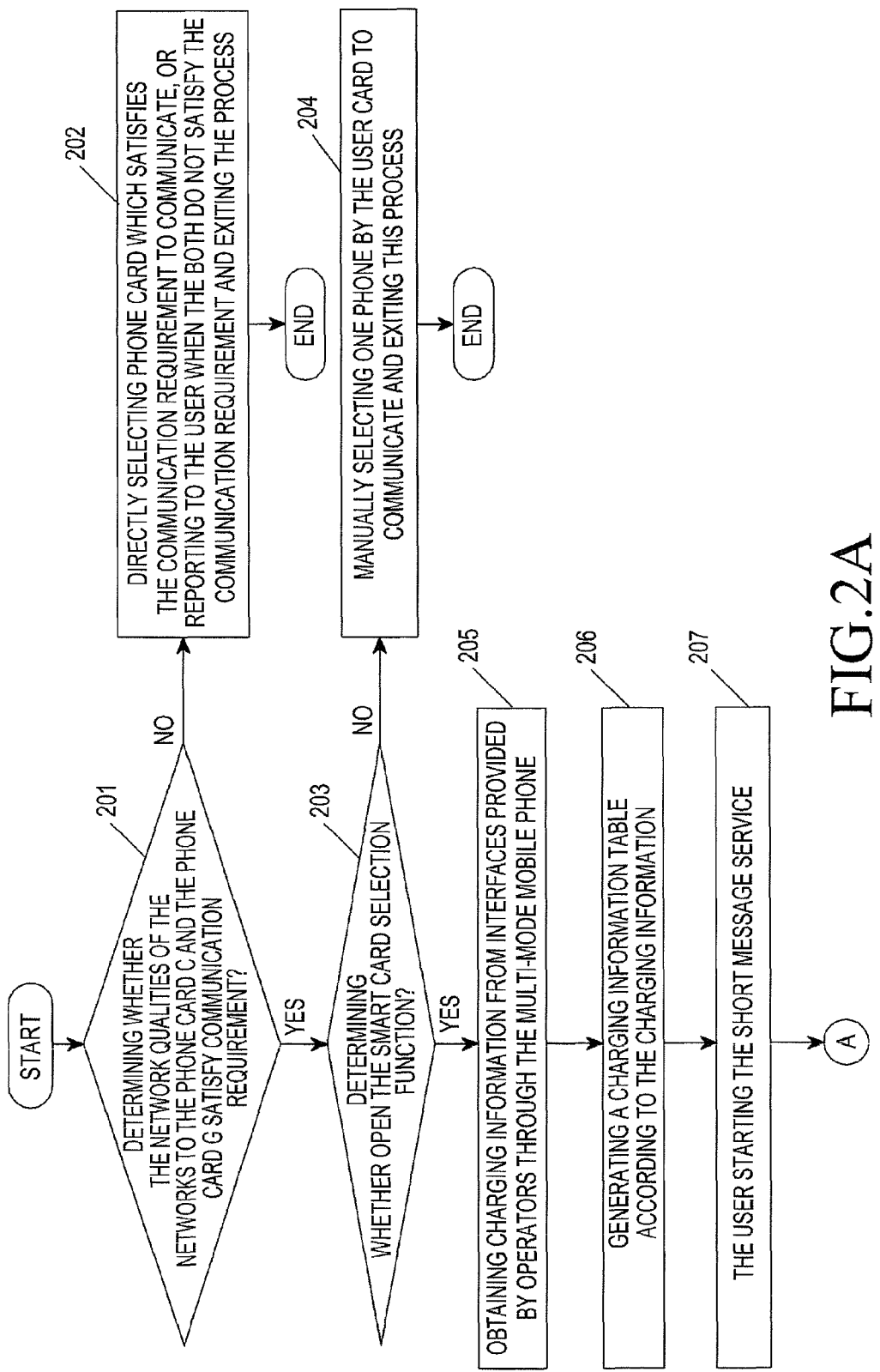
FIG. 2A and FIG. 2B depict a method flowchart according to a second embodiment of the present disclosure.
Figure 2B:
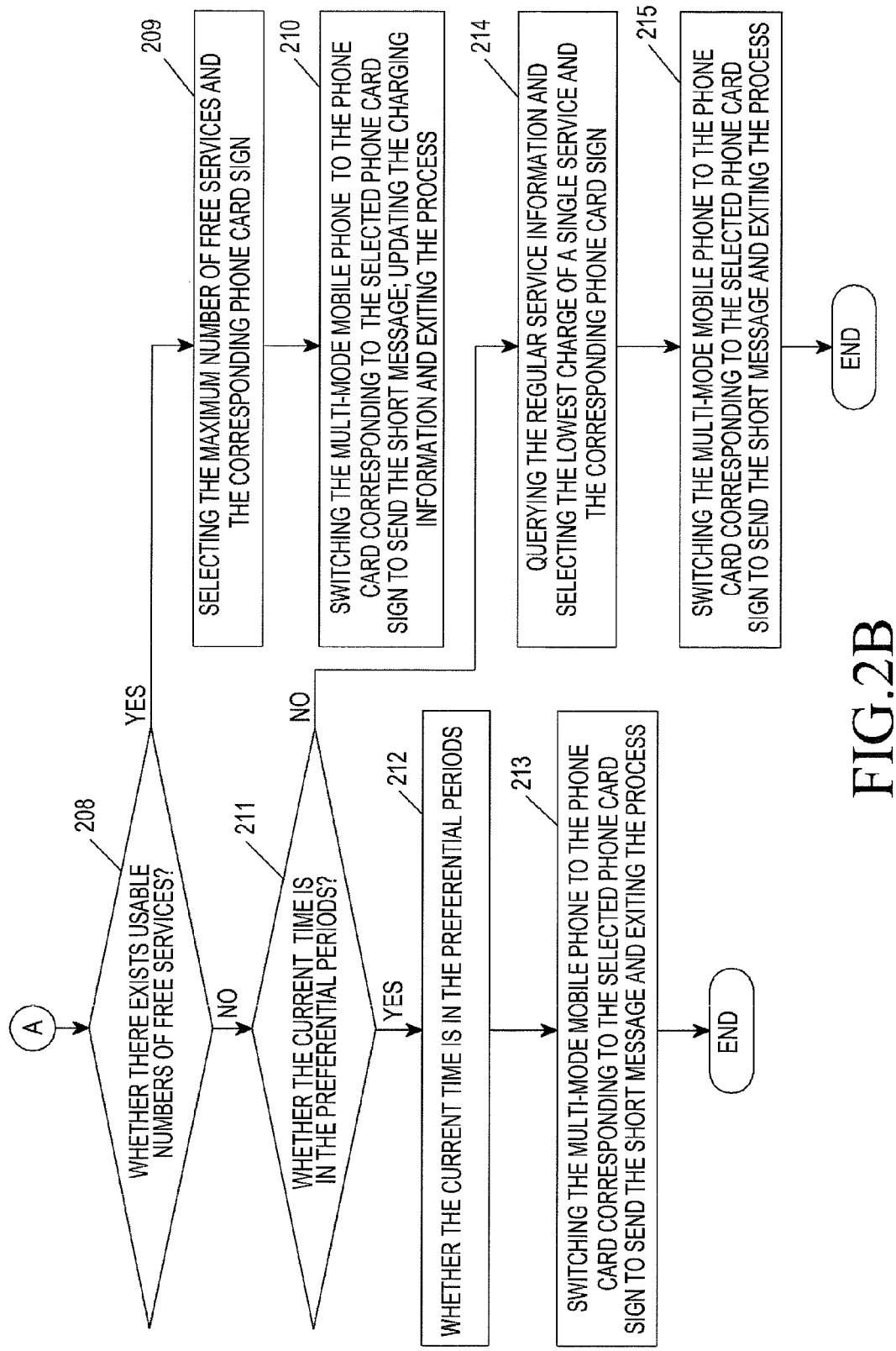

FIGS. 1 through 2B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged mobile device. The core idea of the present disclosure is that the multi-mode mobile phone can obtain charge for each communication service of various communication network modes, and when a user starts some communication service, the multi-mode mobile phone selects the most economical one from the charging information and switches to corresponding phone card. The multi-mode mobile phone then uses this phone card to communicate. Because the selected phone card provides the most economical charge, this can meet the user's desire for cost savings and achieve the purpose of smartly selecting cards.

To better illustrate the technical solutions of the disclosure, several embodiments with detailed description are give below.

First Embodiment

In the first embodiment, the multi-mode mobile phone at includes a phone card. One phone card can support one communication network mode and correspond to a phone card ID. FIG. 1 is a flowchart implemented in this embodiment, the method of this embodiment includes following operations:

Operation 101: The multi-mode mobile phone can obtain charging information from interfaces provided by operators. The charging information includes charges for each communication service of the supported communication network modes.

The interfaces provided by operators can be in the form of short messages, multimedia messages, or mails sent to the user by the operators. The interfaces can also include a website provided by the operators, and the multi-mode mobile phone can directly obtain charging information according to the website. The multi-mode mobile phone can also be connected to a computer terminals and the like, and can obtain charging information through the computer terminal. Any method or interface may be employed, as long as charging information can be obtained.

The multi-mode mobile phone can support a plurality of communication network modes, such as CDMA network, GSM network, and the like. Operators of each communication network mode can provide a variety of communication services, such as short message service, multimedia messaging service, local call service, long-distance call service, network service, and so on. The charging information for the communication services provided in different communication network modes can be different, thus, the multi-mode mobile phone obtains the charging information to select the best way to communicate.

Operation 102: A charging information table can be generated according to the charging information. The charging information table includes correspondence between the phone card identifiers (IDs) and charges for each the communication service.

The operators are assumed to provide a variety of types of services, such as regular services, free services, discount services and the like. The regular services refer to services with standard charges. The free services refer to services without charges. The discount services refer to services with charges lower than standard charges. For example, a multi-mode mobile phone may include m phone cards, and the phone card identifiers of the phone cards are respectively 1, 2, ..., m, where m is an integer greater than or equal to 1. There may be n types of communication services, each of the communication services having a corresponding charge, where n is an integer greater than or equal to 1. In this example, the charging information table can be in the form shown in Table 1 below.

TABLE 1

| Type of service | Phone card ID | Charge for communication service 1 | Charge for communication service 2 | ... | Charge for communication service n |
|---|---|---|---|---|---|
| Type 1 | ID 1 | | | | |
| | ID 2 | | | | |
| | ... | | | | |
| | ID m | | | | |
| ... | ... | ... | ... | ... | ... |

Operation 103: When one communication service is started, the multi-mode mobile phone queries the charging information table, and selects the most economical communication service charge to start the communication service and corresponding phone card ID.

Operation 104: The multi-mode mobile phone switches to a phone card corresponding to the selected phone card ID to communicate.

When the technical solution of this embodiment is employed, no matter how many communication network modes the multi-mode mobile phone supports, and no matter what the differences between the charges for each communication service of various communication network modes, so long as the user starts a communication service, the multi-mode mobile phone can determine the best model according to the charging information table and switch to the corresponding phone card to operate, so that the user's interest in cost savings can be met. For example, after the charging information table is established, the user starts the communication service 1. Then it is found that the phone card ID 2 corresponds to the lowest charge after a query of the charging information table and comparison. Finally, the phone card corresponding to the phone card ID 2 is selected as a working card and the multi-mode mobile phone switches to the phone card corresponding to the phone card ID 2 to communicate.

In actual applications, because the operators can provide a variety of types of services, such as regular services, free services, discount services and the like, and because there are differences between the implementation modalities with respect to different types of services, these distinctions will be described in detail one by one below.

Regular Services:

If the charging information includes regular service information of each communication service, the charging information table includes an association between the phone card IDs and each communication service. In actual applications, short messages and multimedia messages are usually charged per message, that is, a charge for each single message. Local calls or long-distance calls are usually charged according to a charge per minute, that is, a charge of service per unit time. Network services are usually charged monthly, or according to flow or time, that is, flow per unit time, charge of flow per unit, or charge of service per unit time. Therefore, the regular service information can include charge of a single service, charge of service per unit time, or charge of flow per unit or flow per unit time.

In operation 103 of the above embodiment, one process in which the multi-mode mobile phone queries the charging information table, and selects the most economical communication service charge to start the communication service and corresponding phone card ID, can include: querying the regular service information in the charging information table according to the started communication service and selecting the lowest charge of a single service, the lowest charge of service per unit time, the most flow per unit time or the lowest charge of flow per unit; and selecting the corresponding phone card ID.

As for how to choose the lowest charge of a single service, the lowest charge of service per unit time, the most flow per unit time or the lowest charge of flow per unit, these are related to the type of the started communication service, including the following situations:

a1) When the started communication service is a short message service, the mobile phone queries the regular service information of the short message service in the charging information table and selects the lowest charge of a single service and the corresponding phone card ID.

a2) When the started communication service is a multimedia messaging service, the mobile phone queries the regular service information of the multimedia messaging service in the charging information table and selects the lowest charge of a single service and the corresponding phone card ID.

a3) When the started communication service is a local call service, the mobile phone queries the regular service information of the local call service in the charging information table and selects the lowest charge of service per unit time and the corresponding phone card ID.

a4) When the started communication service is a long-distance call service, the mobile phone queries the regular service information of the long-distance call service in the charging information table and selects the lowest charge of service per unit time and the corresponding phone card ID.

a5) When the started communication service is a network service, the mobile phone queries the regular service information of the network service in the charging information table and selects the lowest charge of service per unit time, the most flow per unit time or the lowest charge of flow per unit, and selects the corresponding phone card ID.

The charging information of the above embodiment only refers to the regular service information, that is, standard charges of each communication service. In actual applications, due to business strategy factors of the operators, there are not only regular services, but also free communication services and/or discount communication services and other types of services. In order to save the charges for the user, the multi-mode mobile phone whenever possible, uses the following free or discount services.

Free Services:

If the charging information includes not only the regular or standard charges but also information regarding each free service of the communication network modes supported by the multi-mode mobile phone, then, the charging information table includes correspondence between the phone card IDs and each free communication service. In actual application, free short messages and multimedia messages are usually free of charge according to the number of items, that is, the number of free services. Local calls or long-distance calls are usually free of charge according to duration such as how many minutes, that is, free service duration. Network services are usually free of charge according to duration or flow, that is, free service flow. Therefore, the free service information described herein can include number of free services, free service duration, or free service flow. This relates to charge modes of the variety of communication services.

In this situation, in operation 103 of the above embodiment, one process in which the multi-mode mobile phone queries the charging information table, and selects the most economical communication service charge to start the communication service and corresponding phone card ID, can include the following.

The mobile phone queries the free service information in the charging information table according to the started communication service. If there exists usable free service information, the mobile phone selects the maximum number of free services, the longest free service duration or the maximum free service flow, and selects the corresponding phone card ID. That is, when querying the charging information table, it may be necessary to determine whether there exists a free communication service to be started. If a free communication service exists, the mobile phone selects the corresponding phone card to communicate. For example, phone card C is charged 0.2 Yuan pert message, and phone card G is charged 0.1 Yuan per message. Phone card C includes 150 items of complimentary short messages while phone card G does not include any items of complimentary short messages. Then, when the multi-mode mobile phone queries the charging information table, the mobile phone determines that there are 150 items of usable short messages which are complimentary, that is, 150 items of short messages can be sent free of charge (the items of short messages herein is the number of services). Thus, the mobile phone selects the corresponding phone card C to send the short message.

As for how to choose the maximum number of free services, the longest free service duration or the maximum free service flow, these are related to types of the started communication service, and can include the following situations:

b1) When the started communication service is a short message service, the mobile phone queries the number of free services of short message service in the charging information table. If there exists usable free service, the mobile phone selects the maximum number of free services and the corresponding phone card ID.

b2) When the started communication service is a multimedia messaging service, the mobile phone queries the number of free services of the multimedia messaging service in the charging information table. If there exists usable free service, the mobile phone selects the maximum number of free services and the corresponding phone card ID.

b3) When the started communication service is a local call service, the mobile phone queries free service duration of the local call service in the charging information table. If there exists usable free service, the mobile phone selects the longest free service duration and the corresponding phone card ID.

b4) When the started communication service is a long-distance call service, the mobile phone queries the free service duration of the long-distance call service in the charging information table. If there exists usable free service, the mobile phone selects the longest free service duration and the corresponding phone card ID.

b5) When the started communication service is network service, the mobile phone queries the free service duration or free service flow of the network service in the charging information table. If there exists usable free service, the mobile phone selects the longest free service duration or maximum free service flow and the corresponding phone card ID.

Discount Services:

If the charging information includes discount service information of each communication network mode supported by the multi-mode mobile phone, then the charging information table includes association between the phone card IDs and each discount service. In actual application, short messages, multimedia messages, local calls, long-distance calls, network service and the like can be charged according to preferential period and preferential charge. Therefore, the discount service information described herein can include preferential period and preferential charge.

In this situation, in operation 103 of the above embodiment, one process in which the multi-mode mobile phone queries the charging information table, and selects the most economical communication service charge to start the communication service and corresponding phone card ID, can include the following:

The mobile phone queries the discount service information in the charging information table according to the started communication service. If the current time is in the preferential period, the mobile phone selects the lowest preferential charge and the corresponding phone card ID. That is to say, when querying the charging information table, it may be necessary to determine whether there exists a preferential communication service to be started. If a preferential communication service exists, the corresponding phone card is selected to communicate. In one example, the local call service of phone card C is charged 0.1 Yuan per minute, and the local call service of phone card G is charged 0.15 Yuan per minute. Phone card G sets a period from six o'clock to eight o'clock to implement a preferential charge of 0.08 Yuan per minute, while the preferential period of phone card C is set from twenty-three o'clock to twenty-four o'clock and the preferential charge is 0.07 Yuan per minute. Then, when the user starts the local call service at seven o'clock, it can be found out that the current time is in the preferential period of the phone card G and the preferential charge is 0.08 Yuan per minute when the multi-mode mobile phone queries the charging information table, and the phone card G will be selected to make a local call.

As for how to choose discount charges, these are related to the types of the started communication service, and can include the following situations:

c1) When the started communication service is a short message service, the mobile phone queries preferential periods of the short message service. If the current time is in one of the preferential periods, the mobile phone selects the lowest preferential charge and the corresponding phone card ID.

c2) When the started communication service is a multimedia messaging service, the mobile phone queries preferential periods of the multimedia messaging service in the charging information table. If the current time is in one of the preferential periods, the mobile phone selects the lowest preferential charge and the corresponding phone card ID.

c3) When the started communication service is a local call service, the mobile phone queries preferential periods of the local call service in the charging information table. If the current time is in one of the preferential periods, the mobile phone selects the lowest preferential charge and the corresponding phone card ID.

c4) When the started communication service is a long-distance call service, the mobile phone queries the preferential periods of the long-distance call service in the charging information table. If the current time is in one of the preferential periods, the mobile phone selects the lowest preferential charge and the corresponding phone card ID.

c5) When the started communication service is a network service, the mobile phone queries the preferential periods of the network service. If the current time is in one of the preferential periods, the mobile phone selects the lowest preferential charge and the corresponding phone card ID.

In the above description, the regular services, the free services, and the discount services are respectively taken as examples to illustrate the first embodiment. In fact, the operators can also simultaneously provide the regular services and the free services, or simultaneously provide the regular services and the discount services, or simultaneously provide the regular services, the free services and the discount services.

If the regular services, the free services and the discount services are simultaneously provided, in operation 103, one process in which the multi-mode mobile phone queries the charging information table and selects the most economical communication service charge to start the communication service and corresponding phone card ID, can include the following.

X1: The mobile phone queries free service information in the charging information table according to the started communication service. If there exists usable free service information, the mobile phone selects the maximum number of free services, the longest free service duration or the maximum free service flow, and selects the corresponding phone card ID. The mobile phone further switches to performing operation 104 and then exits the process. Otherwise, the mobile phone performs operation X2.

X2: The mobile phone queries discount service information in the charging information table according to the started communication service. If the current time is in the preferential period, the mobile phone selects the lowest preferential charge and the corresponding phone card ID. The mobile phone further switches to performing operation 104 and then exits the process. Otherwise, the mobile phone performs operation X3.

X3: The mobile phone queries the regular service information in the charging information table according to the started communication service, and selects the lowest charge of a single service, the lowest charge of service per unit time, the most flow per unit time, or the lowest charge of flow per unit. The mobile phone selects the corresponding phone card ID, further performs operation 104, and then exits the process.

That is to say, if the regular services, the free services and the discount services are simultaneously provided, the free service information can be first queried. If there exists usable free service information, the multi-mode mobile phone implements in a manner according to the above mentioned free services. If there exists no usable free service information, the discount service information is queried. If there exists usable discount service information, the multi-mode mobile phone implements in a manner according to the above mentioned discount services. If there exists no usable discount service information, the regular service is queried, and the multi-mode mobile phone implements in a manner according to the above mentioned regular services. During this process, once a type of usable service is found, the corresponding phone card ID is selected at once to utilize the corresponding phone card to communicate. Of course, when querying the charging information table, the query is based on the type of the started communication service. The manner of querying free service information refers to the above operations from b1) to b5). The manner of querying the discount service information refers to the above operations from c1) to c5). The manner of querying the regular service information refers to the above operations from a1) to a5).

Here, simultaneously providing the regular services, the free services and the discount services is taken as an example to illustrate the first embodiment. In fact, if only the regular services and the free services are provided, operation X2 can be omitted. If only the regular services and the discount services are provided, operation X1 can be omitted.

Second Embodiment

In a second embodiment, the multi-mode mobile phone is assumed to include two phone cards which respectively support CDMA network mode and GSM network mode. The phone card supporting CDMA network mode has an ID of "C", and the phone card supporting GSM network mode has an ID of "G".

In this representative example, the charging information provided by the operators of the CDMA network mode is as follows:

A short message is 0.1 Yuan per message, 150 complimentary short messages, of which 120 are currently remaining;

A multimedia message is 0.2 Yuan per message, 20 items of complimentary multimedia messaging service, of which 5 are currently remaining;

Local call service has a standard charge of 0.2 Yuan per minute, has no free service, but has discount service of which the preferential period is from twenty-one o'clock to seven o'clock and the preferential charge is 0.08 Yuan per minute;

Long-distance call service has a standard charge of 0.3 Yuan per minute, has no free service and no discount service;

Network service includes 10 megabytes (MB) per month, of which 2 MB remains, and has no free service and no discount service.

The charging information provided by the operators of the GSM network mode is as follows:

A short message is 0.15 Yuan per message, 300 complimentary short messages, of which 250 are currently remaining;

A multimedia message is 0.25 Yuan per message, has no free service and no discount service;

Local call service has a standard charge of 0.1 Yuan per minute, has no free service and no discount service;

Long-distance call service has a standard charge of 0.3 Yuan per minute, has no free service but has discount service of which the preferential period is from twenty-two o'clock to five o'clock and the preferential charge is 0.15 Yuan per minute;

Network service includes 30 MB per month, of which 25 MB remains, and has no free service and no discount service.

In selecting a phone card, it may be desirable to consider network quality, whether the user needs to open the smart card selection function, or whether the multi-mode mobile phone is in multi-card multi-standby state (such as dual-card dual-standby state). The actual application of these considerations is relatively complex. This embodiment takes the above complex factors into account, but this related implementation modality is not used to limit the solution of the disclosure.

FIG. 2A and FIG. 2B depict a method flowchart of a second embodiment, and the method of this embodiment includes following operations:

Operation 201: The mobile phone determines whether the network qualities of the networks corresponding to the phone card C and the phone card G satisfy a communication condition. If the condition is satisfied, the mobile phone continues to perform operation 203. Otherwise, the mobile phone performs operation 203.

Operation 202: The mobile phone directly selects the only one phone card which satisfies the communication condition to communicate, or reports to the user when both cards do not satisfy the communication condition and exits the process.

Operation 201 and operation 202 consider the network qualities. The following smart card selection operations are carried out under the presupposition that the dual cards satisfy the network qualities. Of course, the presupposition is considered only in the actual application environment. While just with respect to the issue about how to carry out the smart card selection, the presupposition is not necessary to be considered, and should not be considered to limit the technical solution of the disclosure. Even if the network qualities of the phone card C and the phone card G are not considered, the following smart card selection solution can still be utilized. The result thereof may be bad communication quality. Therefore, this operation can be omitted in the solution of implementing the smart card selection.

Operation 203: The mobile phone determines whether the user opens the smart card selection function. If yes, the mobile phone performs operation 205. Otherwise, the mobile phone performs operation 204.

Operation 204: The mobile phone manually selects one phone by the user card to communicate and exits the process.

Operation 203 and operation 204 consider the user's actual interests. The following smart card selection operations are carried out under the presupposition that the user approves, and can be flexibly used. Of course, similar to the above operation, this operation is also considered only in the actual application environment. While just with respect to the issue about how to carry out the smart card selection, this operation is not necessary, and should not be considered to limit the technical solution of the disclosure. Since, even if whether the user needs to open the smart card selection function is not considered, the following smart card selection solution can still be utilized, or it is defaulted that the user allows opening the smart card selection function. Therefore, this operation can be omitted in the solution of implementing the smart card selection.

Operation 205: The mobile phone obtains charging information from interfaces provided by operators through the multi-mode mobile phone. The charging information includes information regarding each regular service, each free service, and each discount service of the supported communication network modes.

The interfaces described here can be in the various forms of short messages, multimedia messages, mails, websites and the like.

Operation 206: The mobile phone generates a charging information table according to the charging information. The charging information table includes association between the phone card IDs and each regular service, association between the phone card IDs and each free service, and association between the phone card IDs and each discount service.

The multi-mode mobile phone obtains charging information from the interfaces provided by the operators of CDMA network and GSM network, and generates a charging information table, such as shown in Table 2 below, based on the aforementioned assumed information of this embodiment.

the multimedia message service is started and the maximum number of free services is selected, then the selected maximum number of free services is reduced by one after the selection of the phone card. If the local call service or the long-distance call service is started and the longest free service duration is selected, then the longest free service duration is reduced by the service duration used for the communication after the selection of the phone card. If the network service is started and the maximum free service flow is selected, then the maximum free service flow is reduced by the flow used for the communication after the selection of the phone card. Of course, if the content of the charging information is not changed after the selection of the phone card, it is possible not to update the charging information.

Below are examples, in actual application, of how to update the charging information.

Operation 211: The mobile phone queries preferential periods of the short message service in each communication network modes. If the current time is in the preferential periods, the mobile phone performs operation 212. Otherwise, the mobile phone performs operation 214.

Operation 212: The mobile phone selects the lowest preferential charge and the corresponding phone card ID.

Operation 213: The mobile phone switches to the phone card corresponding to the selected phone card ID to send the short message and exits the process.

Operation 214: The mobile phone queries the regular service information of the short message service in each of the communication network modes and selects the lowest charge of a single service and the corresponding phone card ID.

In this embodiment, as the short message is sent, the charge of a single service is the charge for each short message.

TABLE 2

| Service type | Phone card ID | Types of communication service | | | | |
|---|---|---|---|---|---|---|
| | | short message | multimedia message | local call | long-distance call | network |
| Free service | C | residual 120 items (complimentary 150 items) | residual 5 items (complimentary 20 items) | no | no | no |
| | G | residual 250 items (complimentary 300 items) | no | no | no | no |
| discount service | C | — | — | 21:00-7:00, 0.08 Yuan per minute | no | no |
| | G | — | — | no | 22:00-5:00, 0.15 Yuan per minute | no |
| regular service | C | 0.1 Yuan per item | 0.2 Yuan per item | 0.2 Yuan per minute | 0.3 Yuan per minute | residual 2 MB (10 MB per month) |
| | G | 0.15 Yuan per item | 0.25 Yuan per item | 0.1 Yuan per minute | 0.3 Yuan per minute | residual 25 MB (30 MB per month) |

Operation 207: The user starts the short message service.

Operation 208: The multi-mode mobile phone queries the charging information table to query numbers of free services of the short message service in each communication network modes. If there exists usable free services, the mobile phone performs operation 209. Otherwise, the mobile phone performs operation 211.

Operation 209: The mobile phone selects the maximum number of free services and the corresponding phone card ID.

Operation 210: The mobile phone switches to the phone card corresponding to the selected phone card ID to send the short message. The charging information is updated by reducing the selected maximum number of free services by one.

In actual application, for accurate statistical information, the charging information can be updated after the selection of the phone card. For example, if the short message service or Operation 215: The mobile phone switches the multi-mode mobile phone to the phone card corresponding to the selected phone card ID to send the short message and exits the process.

In this embodiment, since both the phone card C and the phone card G have complimentary short messages, and 120 items remain in the phone card C and 250 items remain in the phone card G, then operation 209 will select the phone card G, and operation 210 will directly utilize the phone card G to send short message. Since the short message is free of charge, such a communication of the user will not incur any charge, thereby achieving the purpose of cost savings. Operation 209 in this embodiment is to select the maximum number of free services and the corresponding phone card ID. However, in the actual application, if a plurality of phone cards each has residual usable number of free services, any one can be selected from them, and the purpose of cost savings can also be achieved.

Additionally, for the purpose of example, this embodiment assumes that the user starts the short message service. If the user starts the local call, the long-distance call, or another service, this embodiment can be implemented through querying the free service, the discount service, and the regular service in another order.

For example, if the user starts the long-distance call service, the free service duration of the long-distance call service in each communication network modes is first queried. If there exists no usable free service information, the preferential periods of the long-distance call service in each communication network modes is continued to be queried. Upon a finding that the current time is not in the preferential periods, the regular service information of the long-distance call service in each communication network modes is queried, and the lowest charge of a single service and the corresponding phone card ID is selected. The selected phone card is then utilized to communicate.

In summary, no matter what services the user starts, as long as the charge information is comprehensive, the smart card selection can be implemented according to the solutions of the above embodiments, to achieve the purpose of cost savings.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of selecting cards for a multi-mode mobile phone, the multi-mode mobile phone comprising at least one phone card that supports a communication network mode and corresponds to a phone card ID, the method comprising:
   obtaining charging information from interfaces provided by operators through the multi-mode mobile phone, the charging information including charges for each communication service of the communication network mode supported by the at least one phone card;
   generating a charging information table according to the charging information, the charging information table including an association between the phone card ID and the charge for each communication service;
   querying the charging information table through the multi-mode mobile phone after starting one communication service and selecting a most economical communication service charge from the charging information table for the started communication service and corresponding phone card ID, the querying and selecting comprising:
      querying for free service information in the charging information table according to the started communication service, the free service information comprising a number of free services, a free service duration, or a free service flow; and
      when usable free service information exists, selecting a maximum number of free services, a longest free service duration, or a maximum free service flow, and selecting a phone card ID corresponding to the selected free service information; and
   switching the multi-mode mobile phone to the phone card corresponding to the selected phone card ID to communicate.

2. The method of claim 1, wherein:
   the charge for each communication service includes regular service information of each communication service;
   the charging information table includes an association between the phone card ID and each regular service information; and
   the regular service information includes a charge of a single service, a charge of service per unit time, a charge of flow per unit time, or a charge of flow per unit.

3. The method of claim 2, wherein querying the charging information table and selecting the most economical communication service charge further comprises:
   querying the regular service information in the charging information table according to the started communication service and selecting the lowest charge of a single service, the lowest charge of service per unit time, the most flow per unit time or the lowest charge of flow per unit, and selecting the corresponding phone card ID.

4. The method of claim 3, wherein querying the regular service information in the charging information table and selecting the lowest charge of a single service comprises one of:
   (i) when the started communication service is a short message service, querying the regular service information of the short message service in the charging information table and selecting the lowest charge of a single service and the corresponding phone card ID;
   (ii) when the started communication service is a multimedia messaging service, querying the regular service information of the multimedia messaging service in the charging information table and selecting the lowest charge of a single service and the corresponding phone card ID;
   (iii) when the started communication service is a local call service, querying the regular service information of the local call service in the charging information table and selecting the lowest charge of service per unit time and the corresponding phone card ID;
   (iv) when the started communication service is a long-distance call service, querying the regular service information of the long-distance call service in the charging information table and selecting the lowest charge of service per unit time and the corresponding phone card ID; and
   (v) when the started communication service is a network service, querying the regular service information of the network service in the charging information table and selecting the lowest charge of service per unit time, the most flow per unit time or the lowest charge of flow per unit, and selecting the corresponding phone card ID.

5. The method of claim 1, wherein:
   the charge for each communication service includes the free service information of each communication service.

6. The method of claim 5, wherein the querying the free service information and selecting operations further comprise one of:
   (i) when the started communication service is a short message service, querying numbers of free services of short message services in the charging information table, and when usable free service exists, selecting the maximum number of free services and the corresponding phone card ID;
   (ii) when the started communication service is a multimedia messaging service, querying numbers of free services of the multimedia messaging service in the charging information table, and when usable free service exists, selecting the maximum number of free services and the corresponding phone card ID;
   (iii) when the started communication service is a local call service, querying free service duration of the local call service in the charging information table, and when usable free service exists, selecting the longest free service duration and the corresponding phone card ID;

(iv) when the started communication service is a long-distance call service, querying the free service duration of the long-distance call service in the charging information table, and when usable free service exists, selecting the longest free service duration and the corresponding phone card ID; and (v) when the started communication service is a network service, querying the free service duration or free service flow of the network service in the charging information table, and when usable free service exists, selecting the longest free service duration or maximal free service flow and the corresponding phone card ID.

7. The method of claim 1, wherein:
the charge for each communication service includes discount service information of each communication service;
the charging information table includes correspondence between the phone card ID and each discount service information; and
the discount service information includes a preferential period and a preferential charge.

8. The method of claim 7, wherein when the multi-mode mobile phone queries the charging information table, the selecting of the most economical communication service charge from the charging information table for the started communication service and corresponding phone card ID comprises:
querying the discount service information in the charging information table according to the started communication service; and
when the current time is in a preferential period, selecting the lowest preferential charge and selecting the corresponding phone card ID.

9. The method of claim 8, wherein querying the discount service information in the charging information table and selecting the lowest preferential charge and corresponding phone card ID comprises one of:
(i) when the started communication service is a short message service, querying preferential periods of the short message service, and when the current time is in a preferential period, selecting the lowest preferential charge and selecting the corresponding phone card ID;
(ii) when the started communication service is a multimedia messaging service, querying preferential periods of the multimedia messaging service in the charging information table, and when the current time is in a preferential period, selecting the lowest preferential charge and the corresponding phone card ID;
(iii) when the started communication service is a local call service, querying preferential periods of the local call service in the charging information table, and when the current time is in a preferential period, selecting the lowest preferential charge and the corresponding phone card ID;
(iv) when the started communication service is a long-distance call service, querying the preferential periods of the long-distance call service in the charging information table, and when the current time is in a preferential period, selecting the lowest preferential charge and the corresponding phone card ID; and
(v) when the started communication service is a network service, querying the preferential periods of the network service, and when the current time is in a preferential period, selecting the lowest preferential charge and the corresponding phone card ID.

10. The method of claim 1, wherein:
the charge for each communication service includes regular service information, free service information, and discount service information of each communication service;
the charging information table includes an association between the phone card ID and each regular service information, an association between the phone card ID and each free service information, and an association between the phone card ID and each discount service information;
the regular service information includes a charge of a single service, a charge of service per unit time, a flow per unit time or charge of flow per unit;
the free service information includes a number of free services, a free service duration or a free service flow;
the discount service information includes a preferential period and a preferential charge.

11. The method of claim 10, wherein the querying the charging information table through the multi-mode mobile phone after starting one communication service and selecting the most economical communication service charge from the charging information table for the started communication service and corresponding phone card ID comprises one of:
(i) querying the free service information in the charging information table according to the started communication service, and when usable free service information exists, selecting the maximum number of free services, the longest free service duration or the maximum free service flow, and selecting the corresponding phone card ID;
(ii) querying the discount service information in the charging information table according to the started communication service, and when the current time is in a preferential period, selecting the lowest preferential charge and the corresponding phone card ID; and
(iii) querying the regular service information in the charging information table according to the started communication service, and selecting the lowest charge of a single service, the lowest charge of service per unit time, the most flow per unit time or the lowest charge of flow per unit, and selecting the corresponding phone card ID.

12. The method of claim 1, further comprising updating the charging information table.

13. A method of selecting cards for a multi-mode mobile phone, the multi-mode mobile phone comprising at least one phone card that supports a communication network mode and corresponds to a phone card ID, the method comprising:
obtaining charging information from an operator, the charging information including charges for each communication service of the communication network mode supported by the at least one phone card;
generating a charging information table according to the charging information, the charging information table including an association between the phone card ID and the charge for each communication service;
starting a communication service;
selecting a most economical communication service charge and a corresponding phone card ID from the charging information table based on the started communication service, the selecting comprising:
querying for free service information in the charging information table according to the started communication service, the free service information comprising a number of free services, a free service duration, or a free service flow; and when usable free service information exists, selecting a maximum number of free services, a longest free service duration, or a maximum free service flow, and a phone card ID corresponding to the selected free service information; and switching the multi-mode mobile phone to the phone card corresponding to the selected phone card ID to communicate.

14. The method of claim 13, wherein:
the charge for each communication service includes regular service information of each communication service;
the charging information table includes an association between the phone card ID and each regular service information; and
the regular service information includes a charge of a single service, a charge of service per unit time, a charge of flow per unit time, or a charge of flow per unit.

15. The method of claim 14, wherein selecting the most economical communication service charge from the charging information table further comprises:
querying the regular service information in the charging information table according to the started communication service and selecting the lowest charge of a single service, the lowest charge of service per unit time, the most flow per unit time or the lowest charge of flow per unit.

16. The method of claim 15, wherein selecting the most economical communication service charge from the charging information table comprises one of:
(i) when the started communication service is a short message service, querying the regular service information of the short message service in the charging information table and selecting the lowest charge of a single service;
(ii) when the started communication service is a multimedia messaging service, querying the regular service information of the multimedia messaging service in the charging information table and selecting the lowest charge of a single service;
(iii) when the started communication service is a local call service, querying the regular service information of the local call service in the charging information table and selecting the lowest charge of service per unit time;
(iv) when the started communication service is a long-distance call service, querying the regular service information of the long-distance call service in the charging information table and selecting the lowest charge of service per unit; and
(v) when the started communication service is a network service, querying the regular service information of the network service in the charging information table and selecting the lowest charge of service per unit time, the most flow per unit time or the lowest charge of flow per unit.

17. The method of claim 13, wherein:
the charge for each communication service includes the free service information of each communication service.

18. The method of claim 17, wherein the querying the free service information and selecting operations further comprise one of:
(i) when the started communication service is a short message service, querying numbers of free services of short message services in the charging information table, and when usable free service exists, selecting the maximum number of free services;
(ii) when the started communication service is a multimedia messaging service, querying numbers of free services of the multimedia messaging service in the charging information table, and when usable free service exists, selecting the maximum number of free services;
(iii) when the started communication service is a local call service, querying free service duration of the local call service in the charging information table, and when usable free service exists, selecting the longest free service duration;
(iv) when the started communication service is a long-distance call service, querying the free service duration of the long-distance call service in the charging information table, and when usable free service exists, selecting the longest free service duration; and
(v) when the started communication service is a network service, querying the free service duration or free service flow of the network service in the charging information table, and when usable free service exists, selecting the longest free service duration or maximal free service flow.

19. The method of claim 13, wherein:
the charge for each communication service includes discount service information of each communication service;
the charging information table includes correspondence between the phone card ID and each discount service information; and
the discount service information includes preferential period and preferential charge.

20. The method of claim 19, wherein selecting the most economical communication service charge from the charging information table comprises:
querying the discount service information in the charging information table according to the started communication service; and
when the current time is in a preferential period, selecting the lowest preferential charge and selecting the corresponding phone card ID.

* * * * *